United States Patent Office 2,760,378
Patented Aug. 28, 1956

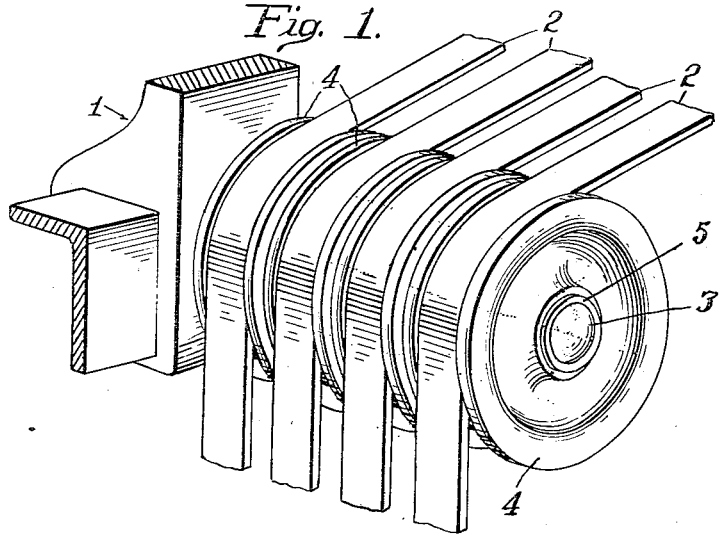
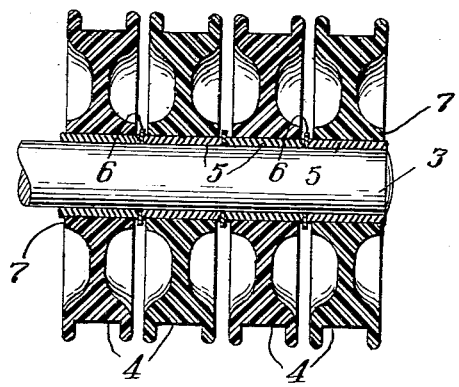

2,760,378

LOOM SHEAVES

Christopher Van Deventer III, Knoxville, Tenn., assignor to National Plastics, Inc., Knoxville, Tenn., a corporation of Delaware Application October 22, 1952, Serial No. 316,139

1 Claim. (Cl. 74—230.01)

This invention relates to improvements in Loom Sheaves adapted particularly for supporting and guiding the harness of looms.

Most loom harnesses involve the use of a plurality of bands, each of which must be guided by a sheave. A multiplicity of sheaves are mounted upon a shaft in juxtaposition with each other in a loom to guide the harness straps in a backward and forward motion. The action of the harness of a loom is quite rapid, requiring a quick motion of the heddle frames carried by the harness, and this results in a fast turning movement of the multiplicity of sheaves, or of individual sheaves connected in a series so as to act together or individually.

It has been proposed heretofore to make such sheaves of plastic material and to mount these on metal bushings on a cross shaft for individual or joint rotation relative thereto. Due to the fast rotation of the sheaves with respect to each other, heat is generated therebetween and often a rubbing action applied to the plastic bodies, all of which is objectionable, due to inefficient mounting of the sheaves on the shaft, rubbing on the plastic body, etc.

One object of this invention is to overcome the objections encountered heretofore in the use of plastic sheaves in looms and other applications, some of which objections have been noted above.

Another object of the invention is to provide for the dissipation of heat between adjacent sheaves of an assembly mounted in side-by-side relation on a shaft while insuring proper lubrication thereof on the shaft.

Still another object of the invention is to improve the construction and mounting of the sheaves, as well as the operation thereof in service, by reason of providing for adequate lubrication and for maintaining the sheaves properly spaced apart to prevent them from rubbing against each other and to prevent the generation of heat between the bearing members or surfaces.

These objects may be accomplished by forming individual sheaves of plastic material provided respectively with bushings for mounting the same on a cross shaft. The sheaves are mounted in side-by-side relation in an assembly and are held spaced apart by thrust washers that are interposed between the bushings and sheaves, and project radially outward sufficiently in the preferred embodiment to act as heat dissipating louvers.

It is known that the rubbing together of like metals, such as bronze bushings or sheaves mounted in side-by-side relation on a shaft, will create heat therebetween which will destroy the mounting and uniform operation of the sheaves. This is prevented by interposing between the bushings thrust disks or washers preferably formed of different materials from the bushings. As an example, the bushings may be formed of porous bronze impregnated with a lubricant, and ferrous metal thrust disks are interposed between the bushings on the shaft to hold the latter properly spaced apart, whereby the bronze bushings do not rub against each other and thereby create heat, but respectively rub against the ferrous metal thrust disk so that little heat is generated in the operation of the sheaves.

This embodiment of the invention is illustrated in the accompanying drawings in which:

Fig. 1 is a perspective view showing an assembly of loom sheaves in which the invention may be applied; and Fig. 2 is a cross section therethrough.

While the invention is illustrated and described as applied to loom sheaves, it is recognized that it may be used in any assembly of sheaves and is not restricted in its application to a loom. The assembly of sheaves may include two or more sheaves mounted in side-by-side relation and in any application thereof as may be desired.

Referring to Fig. 1 of the drawing, I have shown a portion of a loom harness assembly generally designated by the numeral 1 in which harness straps 2 support the usual heddle frames (not shown) and reciprocate the latter upon operation of the harness. The harness may comprise flat straps or cords as frequently used, and the shape of the sheaves will vary according to the nature of the straps employed.

The plurality of sheaves are mounted on a cross shaft generally designated at 3 suitably mounted and supported in the harness 1 of the loom, either at one or both opposite ends thereof, according to the construction of the loom. The length of the cross shaft 3 and the number of sheaves mounted thereon also will vary according to the character of the loom and the number of heddle frames employed therein.

The sheaves are formed of body portions 4, each of which has a peripheral guide surface shaped to guide the parts of the harness, either straps as shown at 2 or cords. Where guide straps are employed in the usual loom harnesses, flanged bodies are used having flat faced guide channels with a flange or flanges on one or both sides thereof, according to the embodiment illustrated in Fig. 2. However, where the harness uses cords for operating the heddle frames, the sheave usually has a concave face as a guide channel therefor.

The body 4 may be molded of any suitable plastic material that is used for molding. Such plastic materials include synthetic resinous compounds such as phenol formaldehyde and other thermosetting materials known to the trade. A binder may be incorporated therein if desired or needed.

The body 4 preferably is molded upon a bushing, generally designated at 5, or the bushing may be inserted into the hub of the body and rigidly secured thereto. It is preferred to use a bushing that is impregnated with lubricant, such as porous bronze material in which lubricant has been introduced or may be introduced, to provide sufficient oil for purpose of lubrication of the sheave on the cross shaft 3.

Interposed between the sheaves on the shaft 3 are thrust disks 6 which are mounted on the shaft between the adjacent ends of aligned bushings 5 and which separate the latter from each other, as well as holding the hubs of the sheaves apart and spaced from each other as shown in Fig. 2. I prefer to use a ferrous metal for the thrust disk 6 and to form the latter with parallel opposite faces which should be machined or formed with a die so as to be made very accurately.

The interposed thrust disks 6 serve to hold the bushings 5 properly spaced apart and to prevent the latter from rubbing directly together in end-to-end relation. This prevents the heating effect that would result otherwise from the rubbing together of like metals. Moreover, it prevents accidental wearing away of the plastic body of the sheave due to danger of contact one with another. It is preferred that the bronze bushings project outward beyond the ends of the hubs 7 of the sheaves and that the thrust disks project radially beyond the peripheries of the bushings, thereby creating a cooling effect between the sheaves and act as heat dissipating louvers.

This construction provides for a cooler operating temperature for the sheaves even when turned at high speed, with a longer life expectancy. The cooling effect will prevent the discharge of lubricant from the bearings and thus preserve the smooth operation of the sheaves over a greater period of time than would be possible otherwise.

The thrust disks need not be lubricated when formed of ferrous metal and used in connection with porous bronze bushings. However, these metals may be reversed and other materials used for the bushings, which however should be self-lubricating, while bronze or other material dissimilar from the material of the bushings may be used to form the thrust disks. The material of the latter, however, should be dissimilar from the material for the bushings to prevent the creation of heat therebetween during operation.

Such construction provides automatically and exactly for the proper spacing of the sheaves from each other and avoids face friction on the sheaves and consequent dusting on the fabric that would result if the sheaves rubbed directly together. The thrust disks of ferrous metal, such as steel, prevents the rubbing together of the bronze bushings and thus insures of cool operation and long life of the sheave and bushing.

While the invention has been illustrated and described in one embodiment, it is recognized that variations and changes may be made therein without departing from the invention as set forth in the claim.

I claim:

A sheave assembly comprising a supporting shaft, a plurality of sheaves mounted on the shaft in side-by-side relation, each of the sheaves including a peripheral rim portion and a hub formed in one integral piece of molded plastic material, a lubricant impregnated porous bronze bushing fixed in the hub and journaling each sheave on the shaft, said bushing extending axially beyond the hub at both ends, and a thrust disc mounted on the shaft between the bushings of adjacent sheaves and projecting radially outward beyond the periphery of the bushings and between the hubs of the sheaves holding the sheaves spaced apart, the thrust discs being formed of ferrous metal and having flat side faces abutting against the adjacent ends of the bushings.

References Cited in the file of this patent
UNITED STATES PATENTS

| | | |
|---|---|---|
| 1,755,253 | Goeser | Apr. 22, 1930 |
| 1,796,673 | Truxell | Mar. 17, 1931 |
| 2,038,010 | Smith | Apr. 21, 1936 |
| 2,060,651 | Allen | Nov. 10, 1936 |
| 2,167,057 | Safford | July 25, 1939 |
| 2,223,872 | McWhorter et al. | Dec. 3, 1940 |
| 2,315,301 | Van Deventer et al. | Mar. 30, 1943 |